United States Patent
Shin

(10) Patent No.: US 6,249,096 B1
(45) Date of Patent: Jun. 19, 2001

(54) APPARATUS AND METHOD FOR DETERMINING COMMUTATION TIME OF SENSORLESS BRUSHLESS DIRECT CURRENT (BLDC) MOTOR

(75) Inventor: Hyun-Ick Shin, Seoul (KR)

(73) Assignee: Fairchild Korea Semiconductor Ltd. (KR)

( * ) Notice: Subject to any disclaimer, the term of this patent is extended or adjusted under 35 U.S.C. 154(b) by 0 days.

(21) Appl. No.: 09/434,038

(22) Filed: Nov. 4, 1999

(30) Foreign Application Priority Data

Nov. 13, 1998 (KR) .................................................. 98-48555

(51) Int. Cl.[7] ...................................................... H02P 5/06
(52) U.S. Cl. ............................ 318/254; 318/138; 318/439
(58) Field of Search ..................................... 318/254, 138, 318/439

(56) References Cited

U.S. PATENT DOCUMENTS

| | | | | |
|---|---|---|---|---|
| 4,250,544 | * | 2/1981 | Alley ..................................... | 364/110 |
| 5,317,243 | * | 5/1994 | Cameron .............................. | 318/254 |
| 5,466,997 | * | 11/1995 | Utenick et al. ...................... | 318/254 |
| 5,694,010 | * | 12/1997 | Oomura et al. ...................... | 318/254 |
| 6,034,493 | * | 3/2000 | Boyd et al. .......................... | 318/254 |

* cited by examiner

Primary Examiner—Robert E. Nappi
Assistant Examiner—Rita Leykin
(74) Attorney, Agent, or Firm—Blakely Sokoloff Taylor & Zafman

(57) ABSTRACT

Disclosed is an apparatus and a method for determining a commutation time of a three phase brushless direct current (BLDC) motor. The apparatus comprises a commutation controlling pulse generation unit receiving a phase voltage of each phase and generating a commutation controlling pulse to determine a commutation time of each phase of the motor; a first counter receiving a first commutation controlling pulse output from the commutation controlling pulse generator and counting the period of commutation controlling pulses; a memory storing one half of the counted values of the period of the first commutation controlling pulses counted by the first counter; a first comparator comparing a counting value of a period of a commutation controlling pulse provided after the first commutation controlling pulse counted by the first counter with one half of the counted values of the first commutation controlling pulses stored in the memory; and an output controller receiving the comparison result of the first comparator and outputting a switching signal to control commutation of each phase of the motor. The method comprises the steps of receiving variations of the BEMF of each phase of the motor and generating commutation controlling pulses for determining a commutation time; counting the period of the commutation controlling pulses; storing one half of counted values of the counted period of the commutation controlling pulses in a memory; counting a period of the commutation controlling pulses provided after the counted commutation controlling pulses; comparing counted number of the commutation controlling pulses input during the counting operation with the value stored in the memory; and generating a switching pulse to perform commutation of each phase of the motor when the comparison results are identical.

18 Claims, 10 Drawing Sheets

APPARATUS AND METHOD FOR DETERMINING COMMUTATION TIME OF SENSORLESS BRUSHLESS DIRECT CURRENT (BLDC) MOTOR

BACKGROUND OF THE INVENTION (a) Field of the Invention

The present invention relates to a brushless direct current (BLDC) motor. More specifically, the present invention relates to an apparatus and method for determining a commutation time of a sensorless BLDC motor.

(b) Description of the Related Art

A BLDC motor driving circuit can effectively drive a motor when a continuous rotating magnetic field of the BLDC motor is formed. In order to form the continuous rotating magnetic field, commutation of each phase must be performed at a proper time. In order to perform a proper commutation, the position of the rotor must be detected. Therefore, devices to detect the rotor are needed, and the devices to detect the position of the rotor include Hall sensors and resolvers. However, when Hall sensors or resolvers are used, the circuit becomes complicated. Hence, in order to ameliorate the inconveniences caused by the addition of Hall sensors, a sensorless BLDC motor has been developed.

The sensorless BLDC detects the position of the rotor using the back electromotive force (BEMF) caused by rotation of the motor.

A proper commutation time of the sensorless BLDC motor will be described.

When the BLDC motor has a large BEMF, the torque of the motor becomes great. Therefore, in order to most effectively drive the motor, a current must be supplied to a coil of a phase having the greatest BEMF. Hence, commutation must be performed at a point delayed by about 30° from a zero cross point of the BEMF distribution curve of each phase in a three phase BLDC motor.

Therefore, it is important to detect the point delayed by 30° from the zero cross point of the BEMF distribution curve in the sensorless BLDC motor so as to effectively drive the motor.

In a conventional method, an R-C combination circuit is used to detect this commutation point.

A conventional apparatus for detecting the commutation point will now be described.

FIG. 1 is a schematic diagram of a conventional apparatus for detecting the commutation point. FIGS. 2(a) and (b) are graphs representing the operations for detecting the commutation point with the apparatus of FIG. 1.

As represented in FIG. 1, a resistor R and a capacitor C are coupled to a stator coil of a phase of the motor in the conventional commutation point detecting apparatus. The voltage at the capacitor C is supplied to a positive terminal of a comparator COMP1, and the voltage at a neutral point is supplied to a negative terminal of the comparator COMP1.

As can be inferred from the drawing, the phase of the voltage that the capacitor C supplies to the positive terminal of the comparator COMP1 is delayed compared to the phase voltage of the motor because of the capacitance of capacitor C. When the values of the capacitance of capacitor C and the resistance of resistor R are adjusted, the time at which the voltage at the capacitor C reaches the voltage of the neutral point can be used as the time to perform commutation. This method is advantageous when the rapid changes of the motor phase voltage causes the capacitor terminal voltage to also follow identical changing patterns. However, since the conventional commutation time detecting apparatus has fixed values of the resistance of resistor R and of the capacitance of capacitor C, an accurate commutation time cannot be determined except for a specific rotation speed.

In order to overcome this problem, values of the resistor and the capacitor appropriate to the rotation speed in a uniform speed drive mode are used. However, when the rotation speed is changed, as in the case of acceleration, efficiency is reduced and use of power is increased, so that the time to reach the uniform speed is increased.

SUMMARY OF THE INVENTION

It is an object of the present invention to implement an apparatus for determining the accurate commutation time for a three phase BLDC motor using a digital circuit even though the rotation speed of the motor changes.

In one aspect of the present invention, the apparatus for determining commutation time of a three phase BLDC motor comprises a commutation controlling pulse generation unit receiving a phase voltage of each phase and generating a commutation controlling pulse to determine a commutation time of each phase of the motor; a first counter receiving a first commutation controlling pulse output from the commutation controlling pulse generator and counting the period of the commutation controlling pulses; a memory storing one half of the counted values of the first commutation controlling pulses counted by the first counter; a first comparator comparing a counted value of the period of a commutation controlling pulse provided after the first commutation controlling pulse counted by the first counter with one half of the counted values of the first commutation controlling pulses stored in the memory; and an output controller receiving the comparison result of the first comparator and outputting a switching signal to control commutation of each phase of the motor.

The apparatus further comprises a second counter receiving the switching signal and counting the period of the switching signal; and a second comparator receiving and comparing one half of the counted values stored in the memory and the counting numbers of the second counter and outputting the comparison result to the output controller.

The commutation controlling pulse generation unit comprises a reference pulse generator receiving phase voltages of each phase of the motor and voltage of a neutral point, and outputting a reference pulse having a uniform period; and a commutation controlling pulse generator receiving the reference pulse of the reference pulse generator, switching signal, and switching noise removing signal of the output controller, and outputting a commutation controlling pulse generating a gate pulse type output each time a logic value of the reference pulse is changed.

The output controller comprises an enable signal generator receiving the commutation controlling pulse and, when the period of the commutation controlling pulse is constant, outputting an enable signal to output the switching signal; an excess counting preventer receiving counted binary values of the first counter and, when the counting binary values exceeds the capacity of the counter, stopping the operation of the first counter; a pre-switching noise removing signal generator receiving the commutation controlling pulse, switching signal and the counted binary value of the second compartor, and generating a pre-switching noise removing signal for generating switching noise removing signals to remove switching noises; a switching noise removing signal generator receiving the pre-switching noise removing signal from the pre-switching noise removing signal generator and counted binary value of the first counter, and removing switching noises generated by switching operations; a pre-switching signal generator receiving an output of the first comparator and outputting a pre-switching signal for generating switching signals; and a switching signal generator receiving the output binary values of the first counter and the pre-switching signal, and outputting a switching signal for performing commutation of each phase of the motor.

In another aspect of the present invention, a method for determining a commutation time of a three phase BLDC motor comprises the steps of receiving variations of the BEMF of each phase of the motor and generating commutation controlling pulses for determining a commutation time; counting the period of the commutation controlling pulses; storing one half of the counted values of the counted commutation controlling pulses in a memory; counting a period of the commutation controlling pulses provided after the counted commutation controlling pulses; comparing the counted number of the commutation controlling pulses input during the counting operation with the value stored in the memory; and generating a switching pulse to perform commutation of each phase of the motor when the comparison results are identical.

The method further comprises the steps of counting the period of commutation controlling pulses after the switching pulse is generated; generating a switching noise removing signal in order to prevent a change of a logic value of the commutation controlling pulse after the generation of the switching pulse; comparing whether or not the counted number of period of the switching pulse is identical with one half of the value stored in the memory; and stopping the changes of the logic values of the commutation controlling pulse when the comparison results are identical so that the generation of a signal to remove noises at time of switching operation is stopped.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 5:
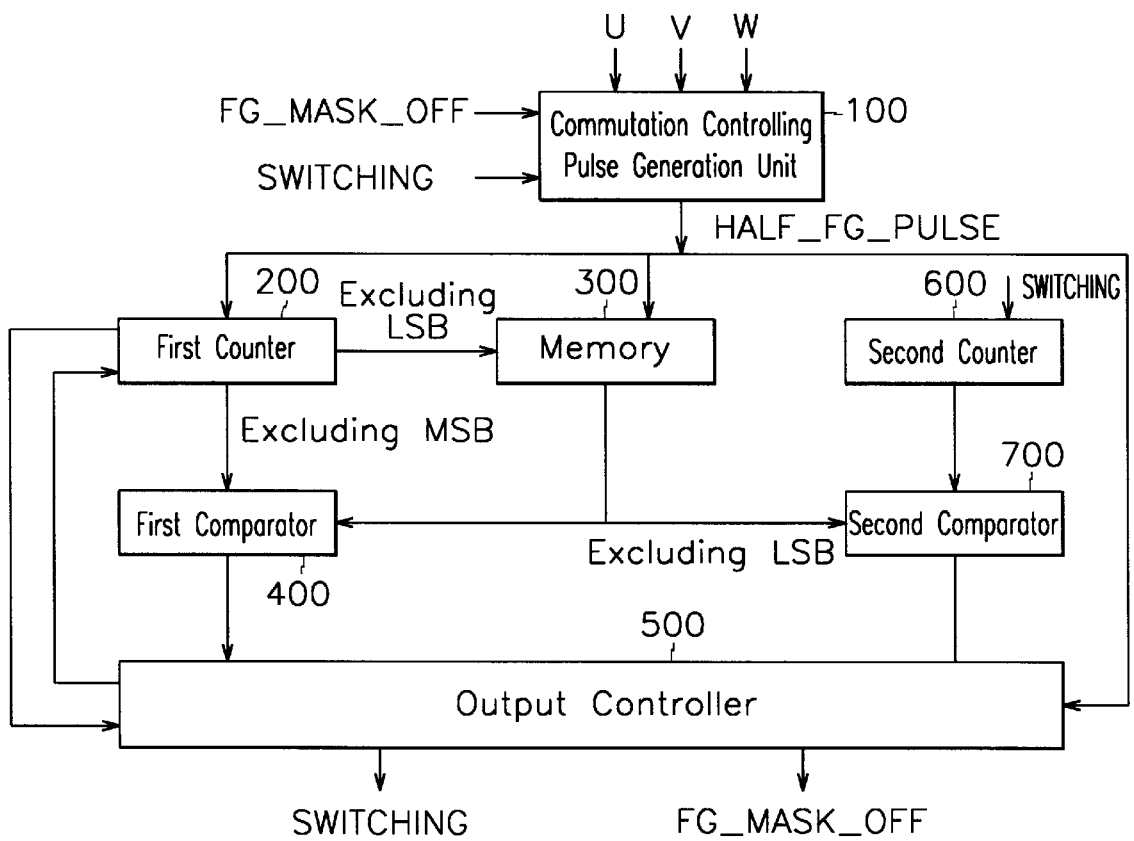
FIG. 5 is a schematic diagram of an apparatus for determining the commutation time according to a preferred embodiment of the present invention.

As represented in FIG. 5, an apparatus for determining a commutation time of a three phase BLDC motor comprises a commutation controlling pulse generator 100, a first counter 200, a memory 300, a first comparator 400, an output controller 500, a second counter 600, and a second comparator 700.

The commutation controlling pulse generator 100 receives SWITCHING switching signals of the output controller 500, FG_MASK_OFF switching noise removing signals, and phase voltages U, V, and W of each phase of the motor. The commutation controlling pulse generator 100 is coupled to the first counter 200, the memory 300, and the output controller 500. The first counter 200 is coupled to the memory 300 and the first memory 400. The memory 300 is coupled to the first comparator 400 and the second comparator 700. The second counter 600 is coupled to the second comparator 700. The first comparator 400 and the second comparator 700 are coupled to the output controller 500.

Figure 6:
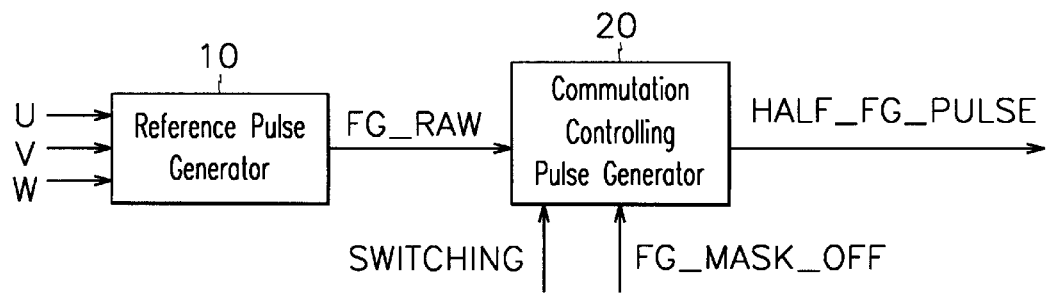
FIG. 6 is a block diagram of a commutation controlling pulse generation unit according to a preferred embodiment of the present invention.

The commutation controlling pulse generator 100 comprises as represented in FIG. 6 a reference pulse generator 10 and a commutation controlling pulse generator 20.

Figure 7:
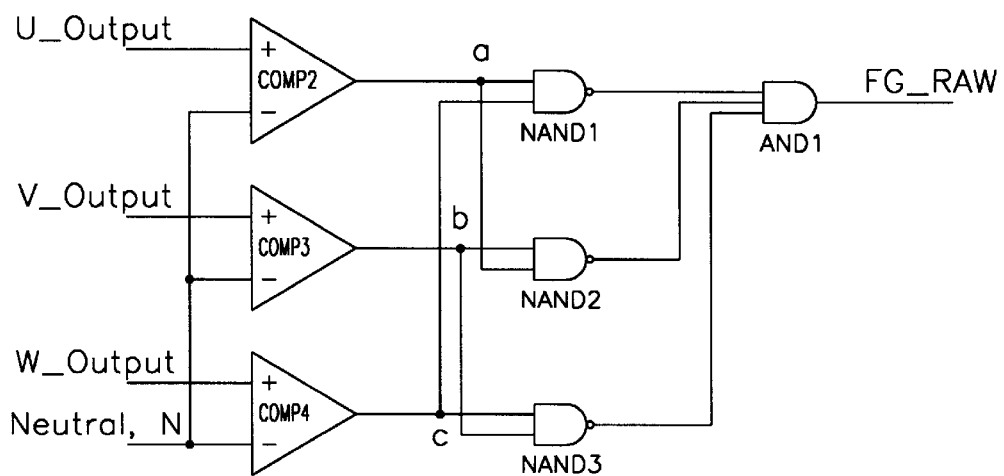
FIG. 7 is a schematic diagram of a reference pulse generator of the commutation controlling pulse generation unit according to a preferred embodiment of the present invention.

The reference pulse generator 10 as shown in FIG. 7 comprises comparators COMP1, COMP2, and COMP3, logic NAND gates NAND1, NAND2, and NAND3, and a logic AND gate AND1. The comparators COMP1, COMP2, and COMP3 respectively receive phase voltages of U, V, and W through positive terminals, and receive the voltage of the neutral point through negative terminals. An output terminal of the comparator COMP2 is coupled to input terminals of the logic NAND gates NAND1 and NAND2. An output terminal of the comparator COMP3 is coupled to input terminals of the logic NAND gates NAND2 and NAND3, and an output terminal of the comparator COMP4 is coupled to input terminals of the logic NAND gates NAND1 and NAND3. Output terminals of the logic NAND gates NAND1, NAND2, and NAND3 are coupled to an input terminal of the logic AND gate AND1.

Figure 13:
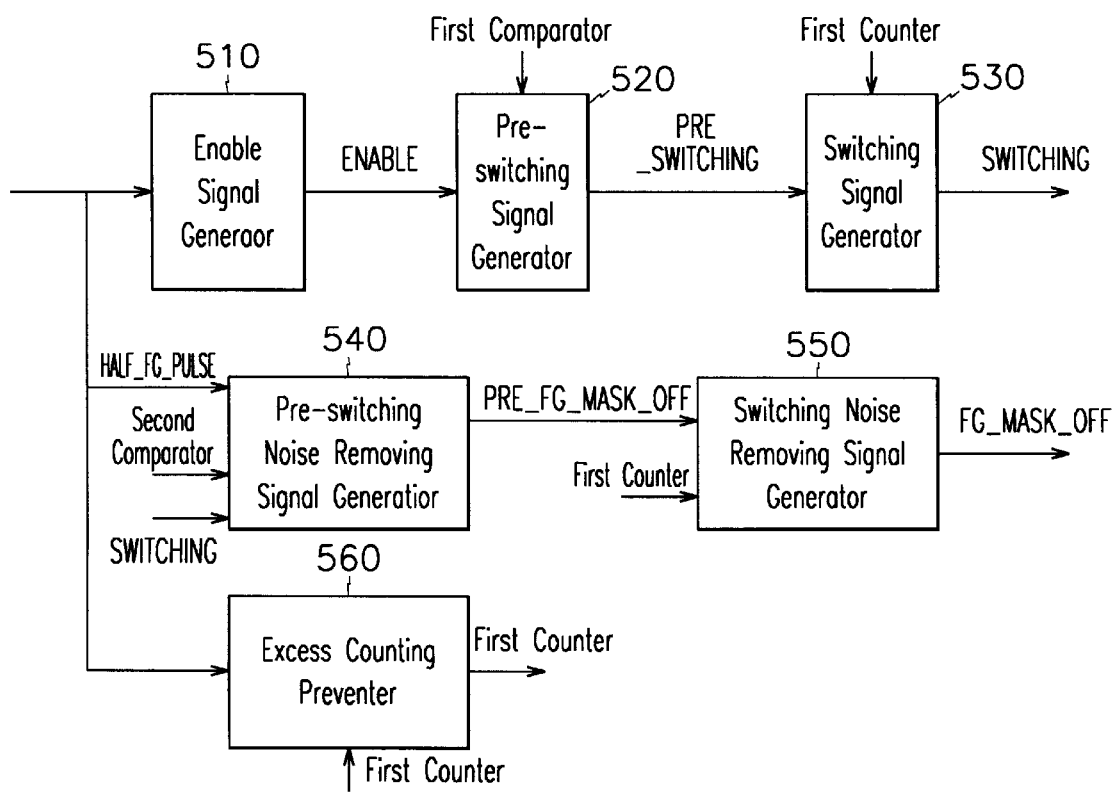
FIG. 13 is a block diagram of an output controller according to a preferred embodiment of the present invention.

The commutation controlling pulse generator 20 (represented in FIG. 8) comprises logic NAND gates NAND4, NAND5, NAND6, NAND7, and NAND8, a logic AND gate AND2, flip-flops FF1, FF2, and FF3, and inverters INV1 and INV2. One input terminal of the logic NAND gate NAND4 is coupled to an output terminal of a switching noise removing signal output unit 550 of the output controller 500 (refer to FIG. 13). Additionally, one input terminal of the logic NAND gate NAND5 is coupled to an output terminal of a switching signal generator 530 of the output controller 500. Another input terminal of the logic NAND gate NAND4 is coupled to the output terminal of the logic NAND gate NAND5, and another input terminal of the logic NAND gate NAND5 is coupled to the output terminal of the logic NAND gate NAND4, and thereby the logic NAND gates NAND4 and NAND5 configure a latch. An input terminal of the logic AND gate AND2 is coupled to a clock signal terminal CLK and the output terminal of the logic NAND gate NAND4. A clock signal input terminal CLK1 of the flip-flop FF1 is coupled to an output terminal of the logic AND gate AND2. An input terminal DI of the flip-flop FF1 is coupled to an output terminal of the reference pulse generator 10. A voltage Vcc is supplied to a reset terminal R1 of the flip-flop FF1. The flip-flop FF2 receives clock signals through a clock signal input terminal CLK2. An input terminal D2 of the flip-flop FF2 is coupled to an output terminal Q1 of the flip-flop FF1. The voltage Vcc is supplied to a reset terminal R2 of the flip-flop FF2. The flip-flop FF3 receives clock signals through a clock signals input terminal CLK3. An input terminal D3 of the flip-flop FF3 is coupled to an output terminal Q2 of the flip-flop FF2. The voltage Vcc is supplied to a reset terminal R3 of the flip-flop FF3. The output terminal Q2 of the flip-flop FF2 is coupled to an input terminal of an inverter INV1. An output terminal Q3 of the flip-flop FF3 is coupled to an input terminal of an inverter INV2. An input terminal of a logic NAND gate NAND6 is coupled to an output terminal of the inverter INV1 and the output terminal of the flip-flop FF3. An input terminal of a logic NAND gate NAND7 is coupled to an output terminal of the inverter INV2 and the output terminal Q2 of the flip-flop FF2. The output terminals of the logic NAND gates NAND6 and NAND7 are coupled to an input terminal of a logic NAND gate NAND8.

The output controller 500 (represented in FIG. 13) comprises an enable signal generator 510, a pre-switching signal generator 520, the switching signal generator 530, a pre-switching noise removing signal generator 540, the switching noise removing signal generator 550, and an excess counting preventer 560.

An input terminal of the enable signal generator 510 is coupled to the output terminal of the commutation controlling pulse generator 100. An output terminal of the enable signal generator 510 is coupled to the pre-switching signal generator 520. The first comparator 400 is coupled to the pre-switching signal generator 520. An output terminal of the pre-switching signal generator 520 is coupled to the switching signal generator 530. The first counter 200 is coupled to the switching signal generator 530. An output terminal of the switching signal generator 530 is coupled to the commutation controlling pulse generator 100. An input terminal of the pre-switching noise removing signal generator 540 is coupled to the output terminal of the commutation controlling pulse generator 100, an output terminal of the second comparator 700, and the output terminal of the switching signal generator 530. An output terminal of the pre-switching noise removing signal generator 540 is coupled to an input terminal of the switching noise removing signal generator 550. The input terminal of the switching noise removing signal generator 550 is coupled to an output terminal of the first counter 200. An output terminal of the switching noise removing signal generator 550 is coupled to the commutation controlling pulse generator 100. An input terminal of the excess counting preventer 560 is coupled to the output terminal of the commutation controlling pulse generator 100 and the output terminal of the first counter 200. An output terminal of the excess counting preventer 560 is coupled to the first counter 200.

Figure 14:
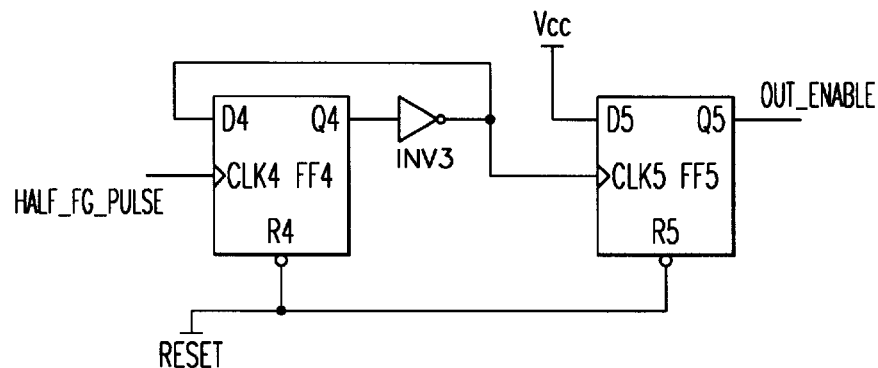
FIG. 14 is a schematic diagram of an enable signal generator of the output controller according to a preferred embodiment of the present invention.

The enable signal generator 510 comprises flip-flops FF4 and FF5, and an inverter INV3 (refer to FIG. 14). A clock signal input terminal CLK4 of the flip-flop FF4 is coupled to the output terminal of the commutation controlling pulse generator 100. An output terminal Q4 of the flip-flop FF4 is coupled to the inverter INV3. An output terminal of the inverter INV3 is coupled to an input terminal D4 of the flip-flop FF4 and an input terminal CLK5 of the flip-flop FF5. An output terminal Q5 of the flip-flop FF5 is coupled to the pre-switching signal generator 520. Input terminals R4 and R5 of the respective flip-flops FF4 and FF5 receive reset signals.

The pre-switching signal generator 520 (refer to FIG. 15) comprises a flip-flop FF6, an inverter INV4, and a logic NAND gate NAND9. The flip-flop FF6 receives clock signals CLK through a clock signal input terminal CLK6. An input terminal D6 of the flip-flop FF6 is coupled to the first comparator 400. The voltage Vcc is supplied to a reset signal input terminal R6. An output terminal Q6 of the flip-flop FF6 is coupled to the inverter INV4. An output terminal of the inverter INV4 is coupled to an input terminal of the logic NAND gate NAND9. An output terminal of the logic NAND gate NAND9 is coupled to the switching signal generator 530.

The switching signal generator 530 (refer to FIG. 16) comprises a logic NAND gate NAND10, a flip-flop FF7, and a logic OR gate OR1. An input terminal of the logic NAND gate NAND10 is coupled to an output terminal of the first counter 200. A reset signal input terminal R7 of the flip-flop FF7 is coupled to an output terminal of the logic NAND gate NAND10. The voltage Vcc is supplied to an input terminal D7 of the flip-flop FF7. A clock signal input terminal CLK7 of the flip-flop FF7 is coupled to the output terminal of the pre-switching switching signal generator 520. An input terminal of the logic OR gate OR1 is coupled to the output terminal of the pre-switching signal generator 520 and the output terminal of the flip-flop FF7.

Figure 17:
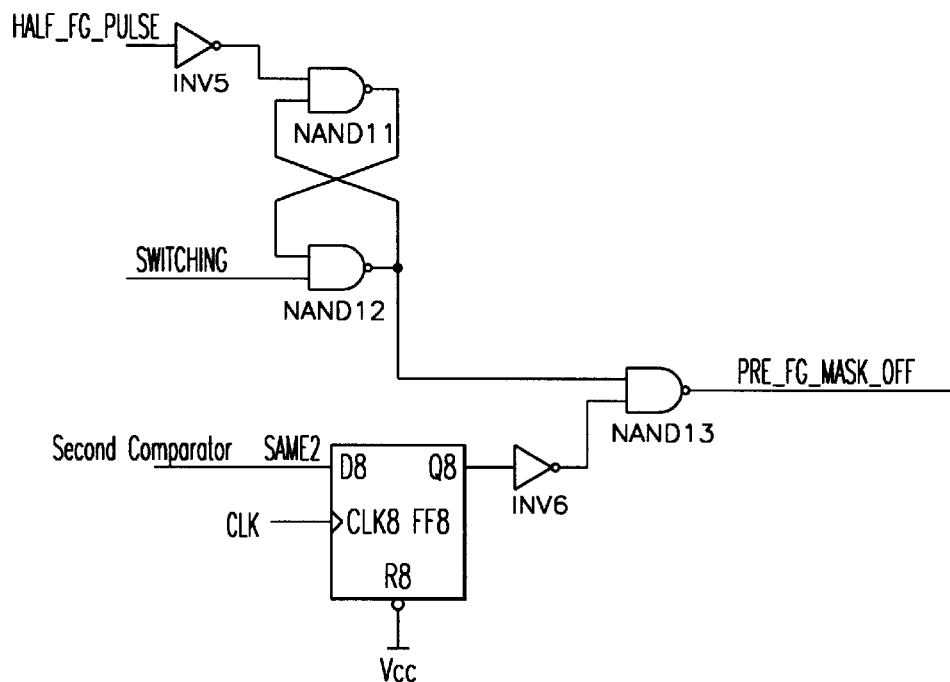
FIG. 17 is a schematic diagram of a pre-switching noise removing signal generator of the output controller according to a preferred embodiment of the present invention.

The pre-switching noise removing signal generator 540 comprises logical NAND gates NAND11, NAND12, and NAND13, a flip-flop FF8, and inverters INV5 and INV6 (refer to FIG. 17). An input terminal D8 of the flip-flop FF8 is coupled to the second comparator 700. The flip-flop FF8 receives clock signals through a clock signal input terminal CLK8. The voltage Vcc is supplied to a reset signal input terminal R8 of the flip-flop FF8. An output terminal Q8 of the flip-flop FF8 is coupled to the inverter INV6. An output terminal of the inverter INV6 is coupled to an input terminal of the logic NAND gate NAND13. The output terminal of the commutation controlling pulse generator 100 is coupled to an input terminal of the inverter INV5. An output terminal of the inverter INV5 is coupled to an input terminal of the logic NAND gate NAND11. An input terminal of the logic NAND gate NAND12 is coupled to the output terminal of the switching signal generator 530. An output terminal of the logic NAND gate NAND11 is coupled to the input terminal of the logic NAND gate NAND12, and an output terminal of the logic NAND gate NAND12 is coupled to the input terminal of the logic NAND gate NAND11, and thereby the logic NAND gates NAND11 and NAND12 configure a latch. The output terminal of the logic NAND gate NAND12 is coupled to an input terminal of the logic NAND gate NAND13. An output terminal of the logic NAND gate NAND13 is coupled to the switching noise removing signal generator 550.

The switching noise removing signal generator 550 comprises a logic NAND gate NAND14, a flip-flop FF9, and a logic OR gate OR2. An input terminal of the logic NAND gate NAND14 is coupled to an output terminal of the first counter 200 (refer to FIG. 18). An output terminal of the logic NAND gate NAND14 is coupled to a reset signal input terminal R9 of the flip-flop FF9. A clock signal input terminal CLK9 of the flip-flop FF9 is coupled to the output terminal of the pre-switching noise removing signal generator 540. The voltage Vcc is supplied to an input terminal D9 of the flip-flop FF9. An output terminal Q9 of the flip-flop FF9 is coupled to one input terminal of the logic OR gate OR2. The pre-switching noise removing signal generator 540 is coupled to another input terminal of the logic OR gate OR2.

Figure 19:
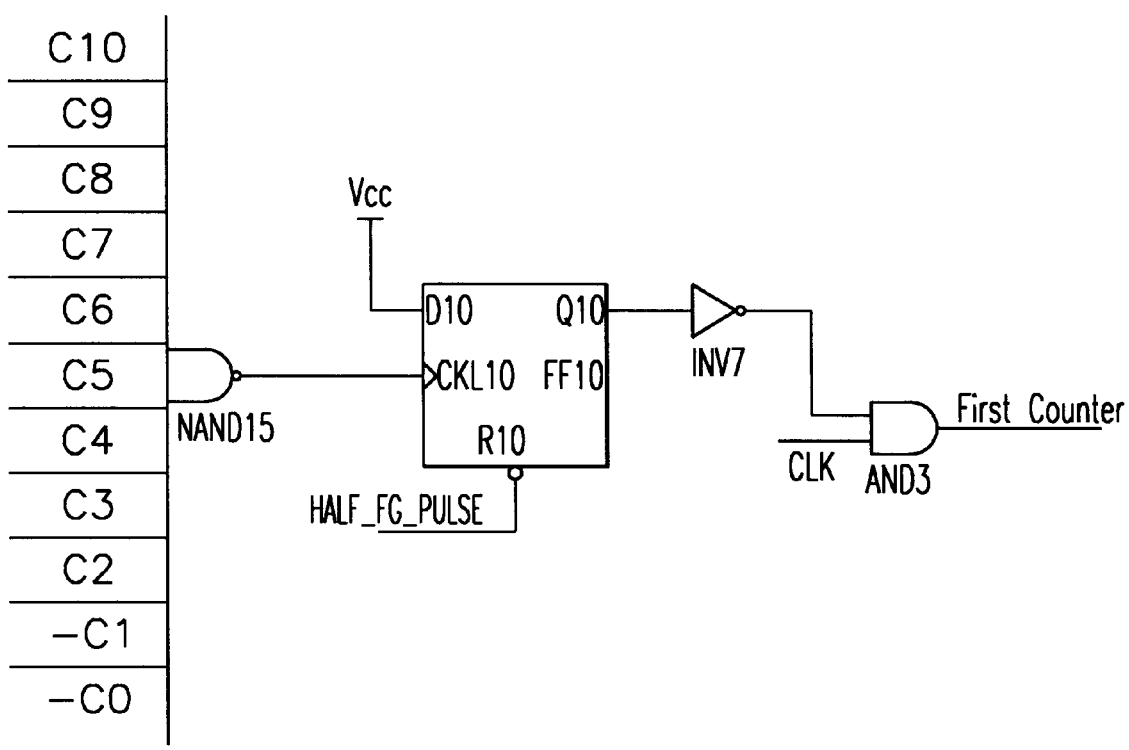
FIG. 19 is a schematic diagram of an excess counting preventer.

The excess counting preventer 560 comprises a logic NAND gate NAND15, a logic AND gate AND3, a flip-flop FF10, and an inverter INV7 (refer to FIG. 19). An input terminal of the logic NAND gate NAND15 is coupled to the first counter 200. An output terminal of the logic NAND gate NAND15 is coupled to a clock signal input terminal CLK10 of the flip-flop FF10. The voltage Vcc is supplied to an input terminal D10 of the flip-flop FF10. A reset signal input terminal R10 of the flip-flop FF10 is coupled to the output terminal of the commutation controlling pulse generator 100. An output terminal Q10 of the flipflop FF10 is coupled to the inverter INV7. An output terminal of the inverter INV7 is coupled to one input terminal of the logic AND gate AND3. Clock signals CLK are provided to the logic AND gate AND3 through another input terminal of the logic AND gate AND3.

The determination of a time for commutation according to a preferred embodiment of the present invention will now be described based on the distribution of the BEMF with reference to drawings.

Figure 1:
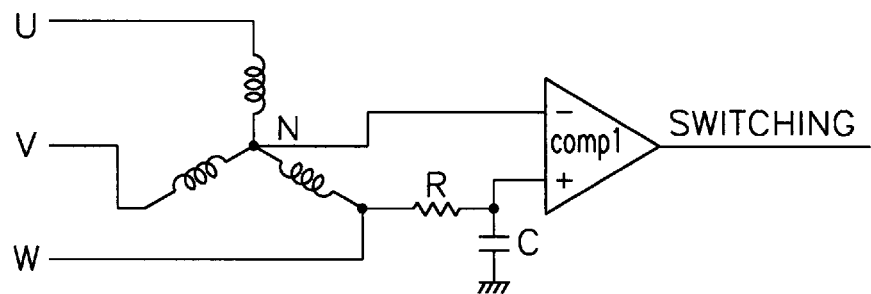
FIG. 1 is a schematic diagram of a conventional apparatus for detecting the commutation point.
Figure 2A:
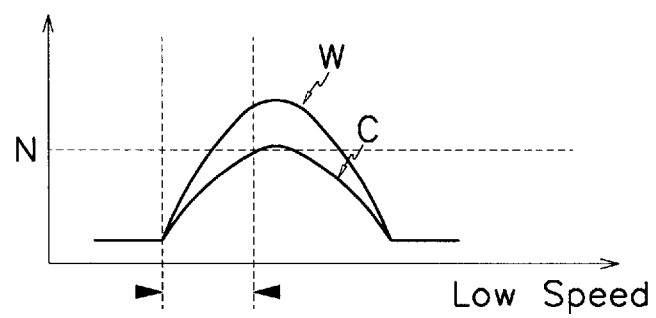
FIGS. 2(a) and (b) are graphs respectively representing a phase voltage of the BLDC motor and a voltage at the capacitor represented in FIG. 1.
Figure 2B:
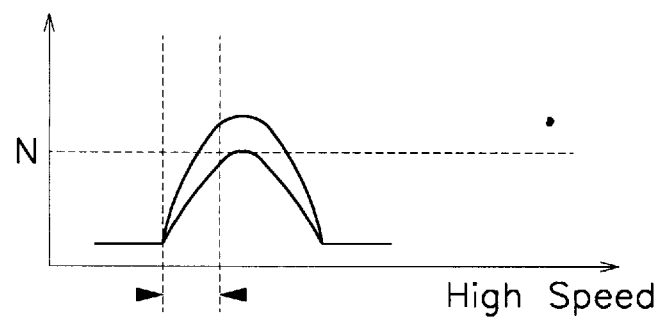
Figure 3:
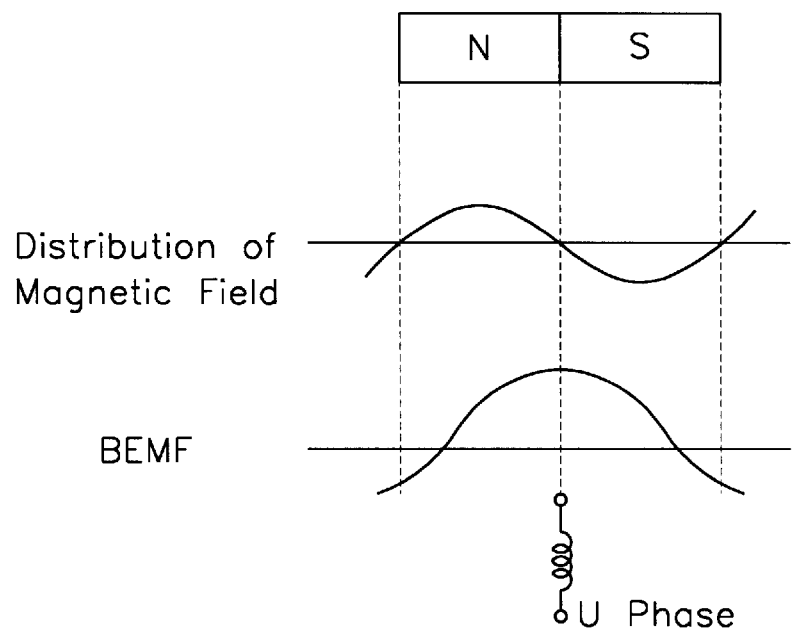
FIG. 3 is a graph representing a distribution of the BEMF generated in a coil of a phase of the stator according to the rotation of a fixed magnet of the rotor of the BLDC motor.

FIG. 3 is a distribution of the BEMF induced from a coil of a phase (represented here by the U phase) according to a distribution of the magnetic field of a permanent magnet and the rotation of a rotor permanent magnet. FIG. 3 is the distribution of the BEMF with respect to the distribution of the magnetic field assuming that the magnetic field of N polarity is positive, since the BEMF induced in the coil is proportional to variation of the strength of the magnetic field with respect to time.

Figure 4:
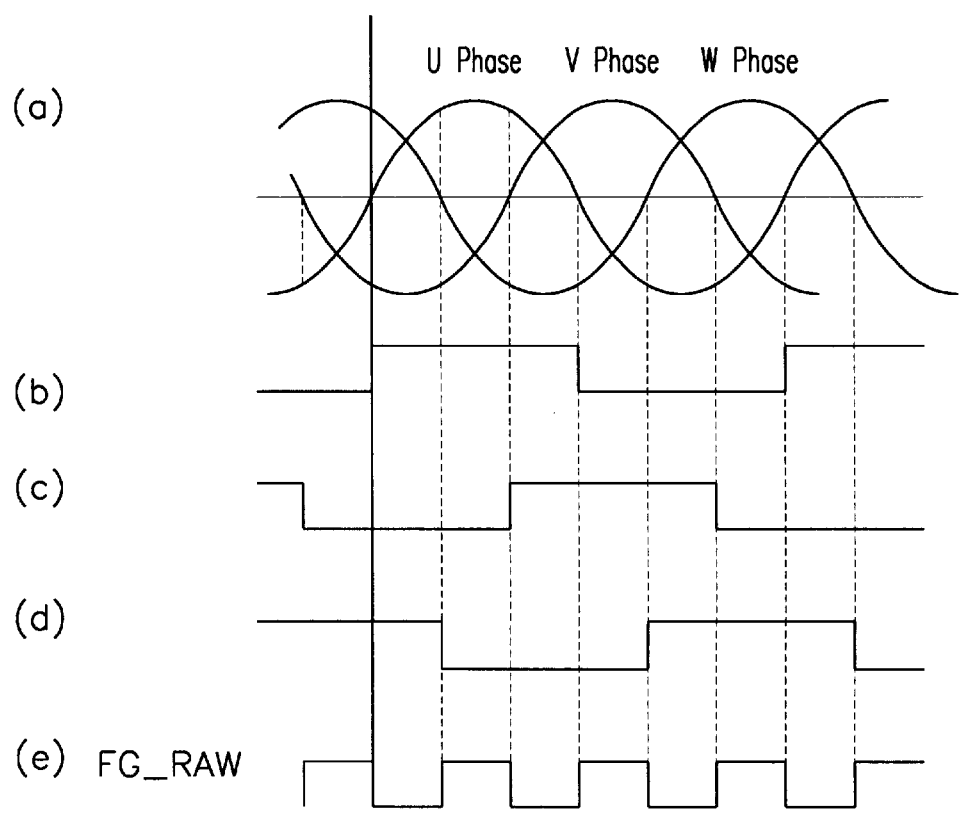
FIG. 4 shows a BEMF distribution curve of the three phases and pulses in a process of generation of a reference pulse.

FIG. 4 depicts a distribution curve of the BEMF induced to the coils of the three phases and a reference pulse (FG_RAW) of the reference pulse generator.

FIG. 4(a) shows three phases of the distribution of the BEMF of FIG. 3. In order for a torque of the motor to be maximized, at any point in time the current must be provided from a phase having a maximum BEMF to a phase having a minimum BEMF. To perform this, commutation is performed at six equal time intervals over one period of the BEMF distribution curve.

In the preferred embodiment of the present invention, the BEMF distribution is converted into a pulse pattern by use of a digital logic circuit to easily determine the commutation time.

A generation process of a commutation controlling pulse (HALF_FG_PULSE), a reference pulse to perform a commutation operation, will now be described.

Figure 8:
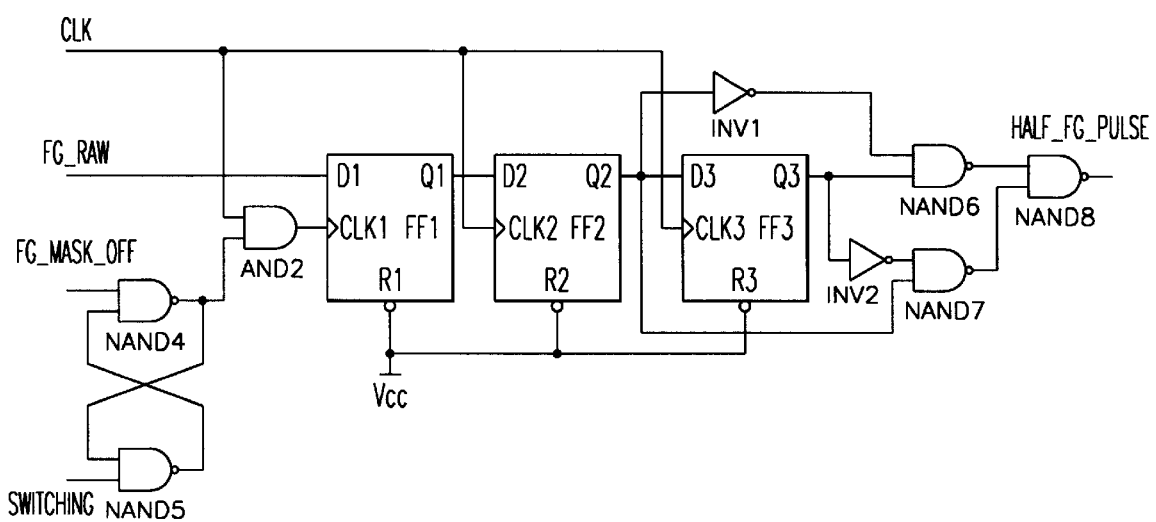
FIG. 8 is a schematic diagram of a commutation controlling pulse generator according to a preferred embodiment of the present invention.

FIG. 7 is a schematic diagram of a reference pulse generator 10. FIG. 8 is a schematic diagram of a commutation controlling pulse generator 20.

The reference pulse generator 10 of the commutation controlling pulse generation unit 100 receives phase voltages through positive terminals of the comparators COMP1, COMP2, and COMP3, and receives the voltage at the neutral point through the negative terminals of these same comparators, and compares the received voltages. Output voltages of the comparators COMP1, COMP2, and COMP3 are shown in FIGS. 4(b), (c), and (d).

Referring to FIG. 4(e), the comparators output a reference pulse FG_RAW passing through the logic NAND gates NAND1, NAND2, and NAND3, and the logic AND gate AND1.

A period of the reference pulse FG_RAW occurs three times during one period of the BEMF distribution curve.

The reference pulse FG_RAW is input to the commutation controlling pulse generator 20.

The latch comprising the logic NAND gates NAND4 and NAND5 removes switching noises.

When a clock signal CLK is provided to the clock signal input terminal CLK1 of the flip-flop FF1, the reference pulse FG_RAW is output from the output terminal Q1 of the flip-flop FF1. It is assumed here that the flip-flop outputs a value when the clock signal is switched from a low state to a high state.

Since the logic value of the reference value FG_RAW is first low, the output values Q1, Q2, and Q3 of the flip-flops FF1, FF2, and FF3 are set at a low state.

Hence, an initial output value of the logic NAND gate NAND8 is low.

When a second clock signal is input, the output value Q2 of the flip-flop FF2 becomes high. Simultaneously, the output value of the inverter INV1 becomes low, the output value of the logic NAND gate NAND6 becomes high, and the output value of the logic NAND gate NAND7 becomes low. Therefore, the output value of the logic NAND gate NAND8 becomes high.

When a third clock signal CLK is input, the output value of the flip-flop FF3 is switched to a high state, and the output value of the logic NAND gate NAND6 becomes high, and the output value of the logic NAND gate NAND7 becomes high. Therefore, the output value of the logic NAND gate NAND8 becomes low.

Hence, when the reference pulse FG_RAW is switched from low state to high state, the commutation controlling pulse generator 20 essentially outputs a low-high-low clock like gate pulse, HALF_FG_PULSE.

When the logic value of the reference pulse FG_RAW is switched from high state to low state, since the logic value of the previous reference pulse FG_RAW is high, the output values of the flip-flops FF1 and FF2 are set as high.

The output value of the logic NAND gate NAND8 is still low.

When a second clock signal CLK is input into the flip-flop FF2, the output value Q2 of the flip-flop FF2 becomes low. Simultaneously, an output value of the inverter INV1 becomes high, an output value of the logic NAND gate NAND6 becomes low, and an output value of the logic NAND gate NAND7 becomes high. Therefore, an output value of the logic NAND gate NAND8 becomes high.

When a third clock signal CLK is input to the flip-flop FF3, an output value of the flip-flop FF3 is switched to low state, and the output value of the logic NAND gate NAND6 becomes high. The output value of the logic NAND gate NAND7 becomes high. Therefore, the output value of the logic NAND gate NAND8 becomes low.

Figure 9:
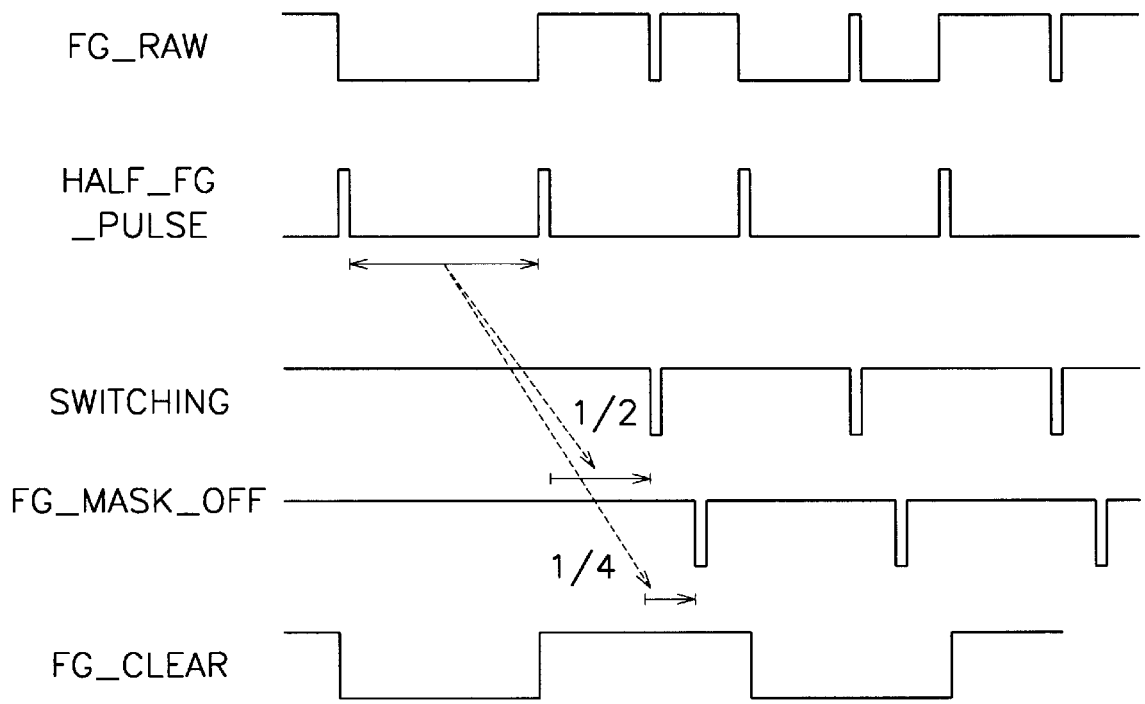
FIG. 9 is a timing chart of the operations of a preferred embodiment of the present invention.

Therefore, when the reference pulse FG_RAW is switched from high to low, the commutation controlling pulse generator 20 outputs another low-high-low clock like gate pulse HALF_FG_PULSE as shown in FIG. 9.

Hence, when the reference pulse FG_RAW is input to the commutation controlling pulse generator 20, a gate pulse is generated which has a duration of the clock signal when the logic value is either switched from high to low or from low to high, as shown in FIG. 9.

These gate pulses are called commutation controlling pulses HALF_FG_PULSE that are to be used to determine the commutation time hereinafter.

Referring to FIG. 4, commutation of each phase of the motor must be performed twice over a period of the reference pulse FG_RAW at equal time intervals. As a result, referring to FIG. 9, commutation must be performed at an intermediate point between pulses of the commutation controlling pulse HALF_FG_PULSE.

Therefore, in order to accurately determine the commutation time, it is important to precisely detect the point in between the commutation controlling pulses of the HALF_FG_PULSE signal.

An operation to determine the commutation time will now be described.

In order to find the intermediate point of the commutation controlling pulse HALF_FG_PULSE, the period of the commutation controlling pulse is counted by the first counter 200. A point in time which is equivalent to one half of the counted number of clock signals becomes the commutation time.

After the gate pulse of the commutation controlling pulse HALF_FG_PULSE is input, the first counter 200 measures the period of the commutation controlling pulse by counting the number of the clock signals CLK. Here, the initially counted commutation controlling pulse HALF_FG_PULSE is referred to as a first commutation controlling pulse.

The binary number of clock signals counted after the first commutation controlling pulse is stored in the memory 300 except for the least significant bit (LSB) of this binary number. This is done so as to store only one half of the counted clock signals in the memory 300, since a binary number with the LSB excluded becomes a value which is half of the original binary number.

The first counter 200 counts the duration of the commutation controlling pulse following the first commutation controlling pulse in the same manner as it counts the duration of the first commutation controlling pulse.

The number of clock pulses of the counted commutation controlling pulses are transmitted to the first comparator 400. The first comparator 400 compares the number of clock pulse from the first counter 200 with the number of clock signals which equal one half of the number of clock signals of the (previous) first commutation controlling pulse. If compared results are identical, a low signal is transmitted to the output controller 500. A high signal can also be used instead of the low signal.

An operation to output a SWITCHING switching signal for performing commutation according to the operation of the first comparator at the output controller 500 will now be described with reference to the drawings.

Operation of the enable signal generator 510 will now be described.

Figure 10:
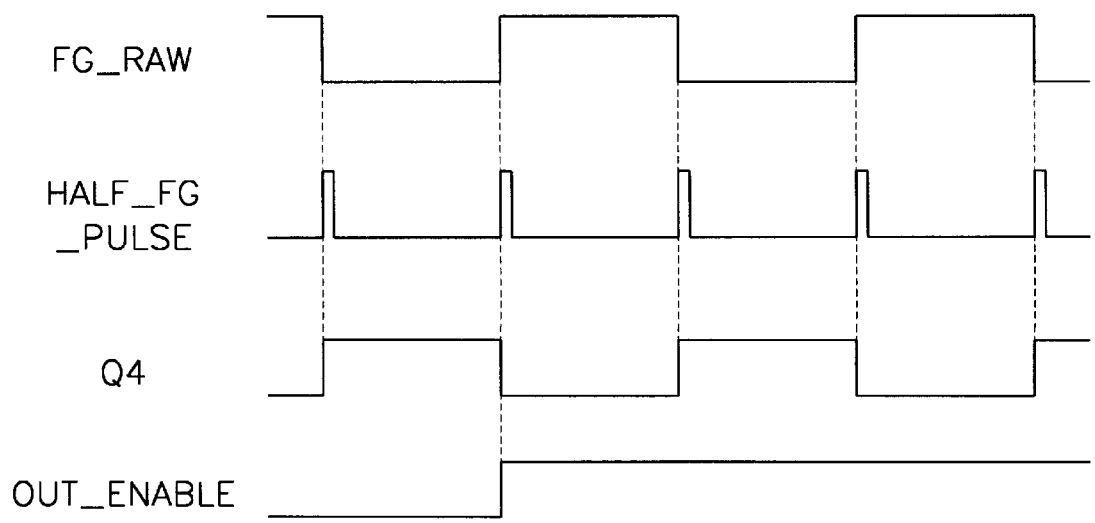
FIG. 10 is a timing chart of an enable signal according to a preferred embodiment of the present invention.

FIG. 14 shows the enable signal generator 510, and FIG. 10 shows a timing chart of the enable signal generator 510.

The enable signal generator 510 outputs the switching signal SWITCHING when a commutation controlling pulse HALF_FG_PULSE following a first commutation controlling pulse starts to be input so that the first commutation controlling pulse performs a switching operation after regular commutation controlling pulses are generated.

An output value of the output terminal Q4 of the flip-flop FF4 of the enable signal generator 510 is initially set at a low state, and the logic value of the input terminal D4 is high since the output terminal Q4 is coupled to an inverter. When a first gate pulse of the commutation controlling pulses of the HALF_FG_PULSE signal is input to the clock signal input terminal CLK4 and the logic value is switched from low to high, the output value of the output terminal Q4 is switched to high, and the input value of the input terminal D4 is switched to low. When the next gate pulse is input, the output value of the output terminal of the flip-flop FF4 is switched from high to low. Therefore, the output value of the output terminal Q4 of the flip-flop FF4 has a period identical with the period of the reference pulse FG_RAW, but with an inverted logic value pulse pattern.

At this time, since an inverted output value of the flip-flop FF4 is provided to the clock signal input terminal CLK5 of the flip-flop FF5, a pulse having identical pattern with the reference pulse FG_RAW is provided to the clock signal input terminal GLK5 of the flip-flop FF5. However, since the voltage Vcc is supplied to the input terminal D5 of the flip-flop FF5, the output value of the flip-flop FF5 is low before a second commutation controlling pulse is input, and when the second commutation controlling pulse HALF_FG_PULSE is input to flip-flop FF4, the flip-flop FF5 continues to output high logic values. Therefore, the enable signal generator 510 outputs enable signals of high output signals after the second commutation controlling pulse HALF_FG_PULSE is input (refer to FIG. 10).

Operations of the pre-switching signal generator 520 and the switching signal generator 530 will now be described.

Figure 11:
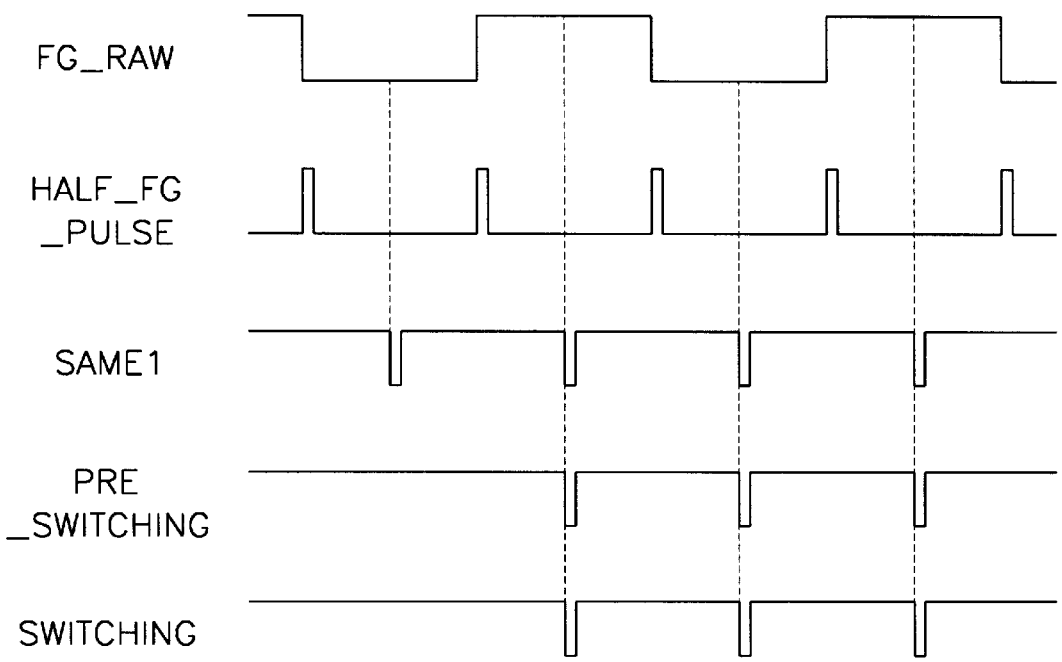
FIG. 11 is a timing chart of a switching signal according to a preferred embodiment of the present invention.
Figure 15:
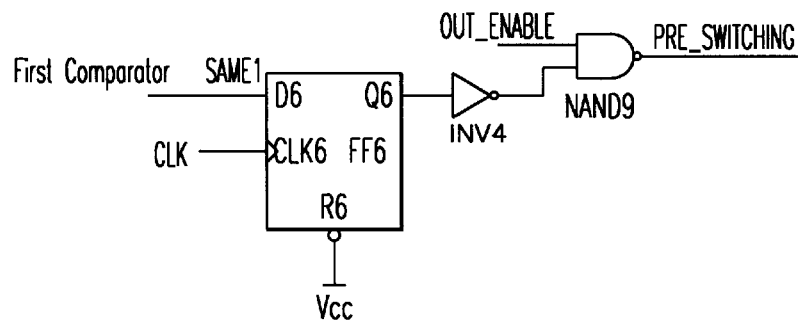
FIG. 15 is a schematic diagram of a pre-switching signal generator of the output controller according to a preferred embodiment of the present invention.
Figure 16:
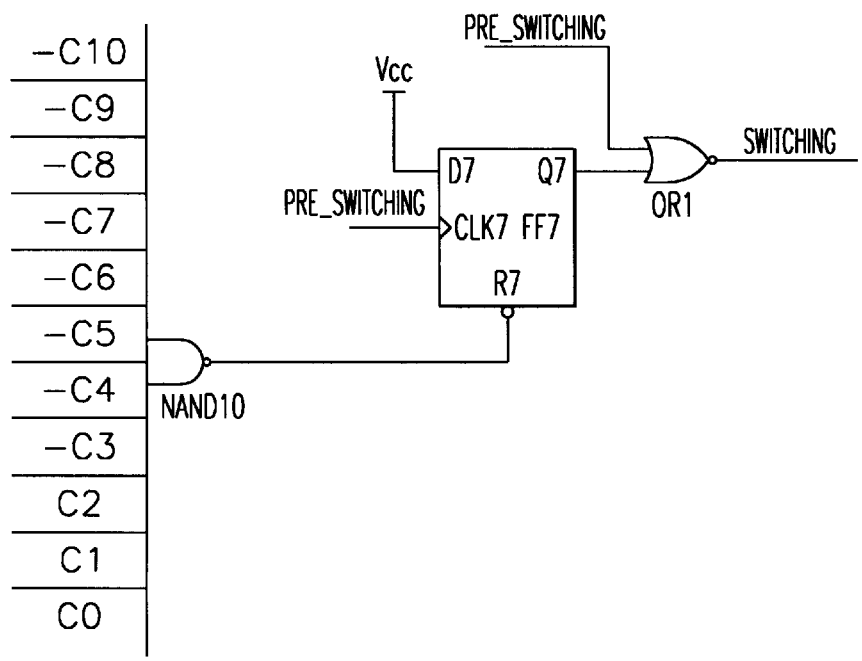
FIG. 16 is a schematic diagram of a switching signal generator of the output controller according to the preferred embodiment of a present invention.

FIG. 15 shows a schematic diagram of the pre-switching signal generator 520, FIG. 16 shows a schematic diagram of the switching signal generator 530, and FIG. 11 shows timing chart of the pre-switching signal and switching signal.

The switching signal SWITCHING performs commutation on each phase of the motor, and is generated at a mid point between the commutation controlling pulses of the HALF_FG_PULSE signal.

Since the input terminal D6 of the flip-flop FF6 is coupled to the output terminal of the first comparator 400 and clock signals CLK are provided to the clock signal input terminal CLK6 of the flip-flop FF6, each time the clock signal is switched from low to high, the output value of the first comparator 400 provided to the input terminal D6 is transmitted to the output terminal Q6. However, since it is assumed that the first comparator 400 outputs a low value only when the compared results are identical, a gate pulse which is switched to a high state only when the compared results are identical is input to the input terminal of the logic NAND gate NAND9. Since an enable signal OUT_ENABLE is input to another input terminal of the logic NAND gate NAND9, the logic NAND gate NAND9 outputs a pre-switching signal PRE_SWITCHING having identical form with the desired switching signal of FIG. 9.

Operation of the switching signal generator 530 will now be described.

FIG. 16 is a schematic diagram of a switching signal generator.

The logic NAND gate NAND10 performs a NAND operation on the three less significant bits of the binary values of the first counter 200 and the remaining inverted bits. The logic NAND gate NAND10 clears the output values of the output terminal Q7 of the flipflop FF7 after the commutation controlling pulse HALF_FG_PULSE is provided. Since the pre-switching signal PRE_SWITCHING is input to the flip-flop FF7 through the clock signal input terminal CLK7, and the voltage Vcc is supplied to the input terminal D7, the output terminal Q7 outputs an output value that changes from low to high when the pre-switching signal is changes from low to high.

Since the logic OR gate OR1 performs an OR operation on the PRE_SWITCHING and the output value of the flip-flop FF7, the logic OR gate OR1 outputs a pulse identical with the PRE_SWITCHING signal. Therefore, the switching signal generator 530 output the switching signal as shown in FIG. 9.

Operations of the pre-switching noise removing signal generator 540 for removing noises according to switching operation, and the switching noise removing signal generator 550 will now be described.

Figure 12:
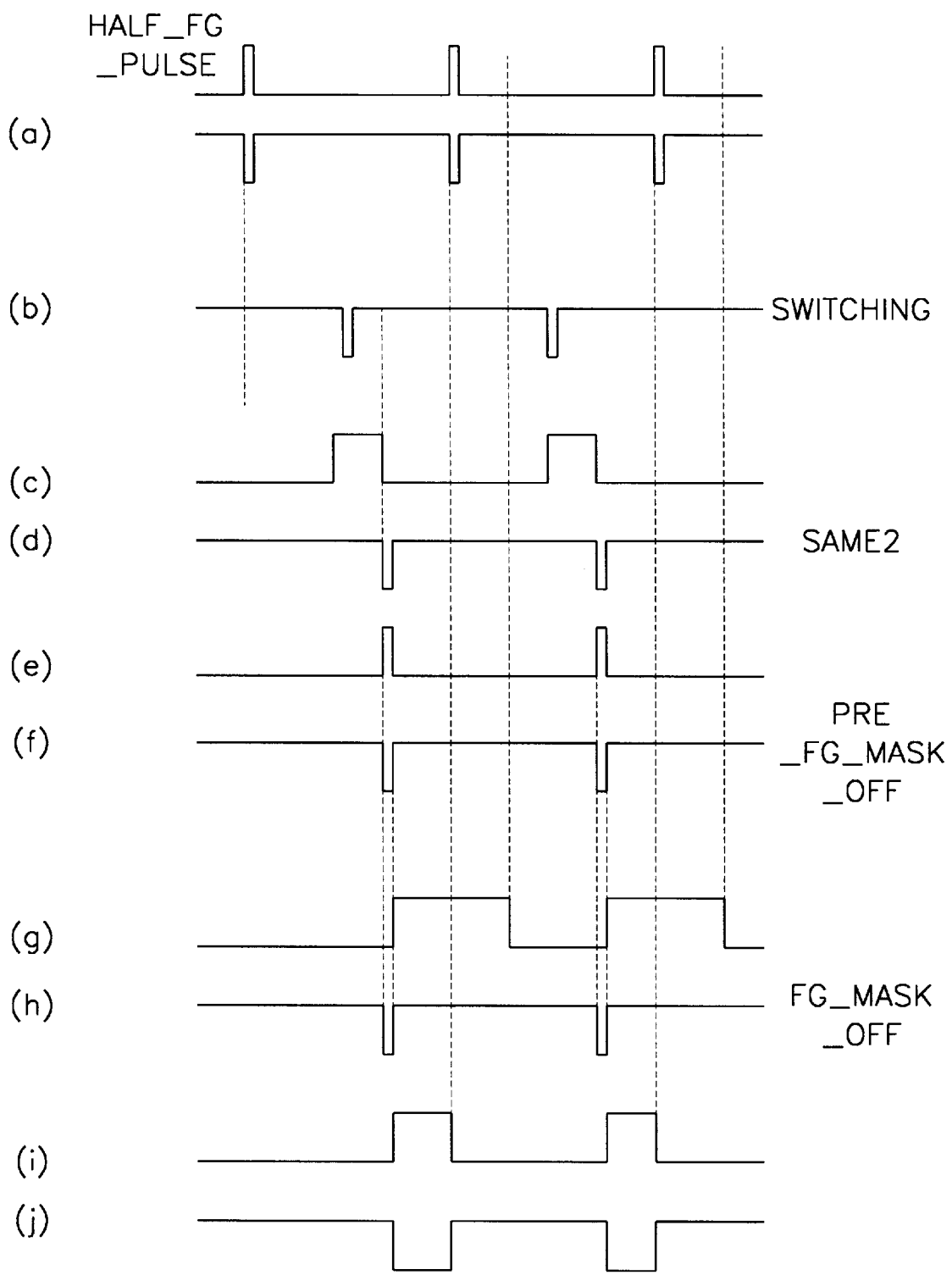
FIG. 12 is a timing chart of a switching noise removing signal according to a preferred embodiment of the present invention.
Figure 18:
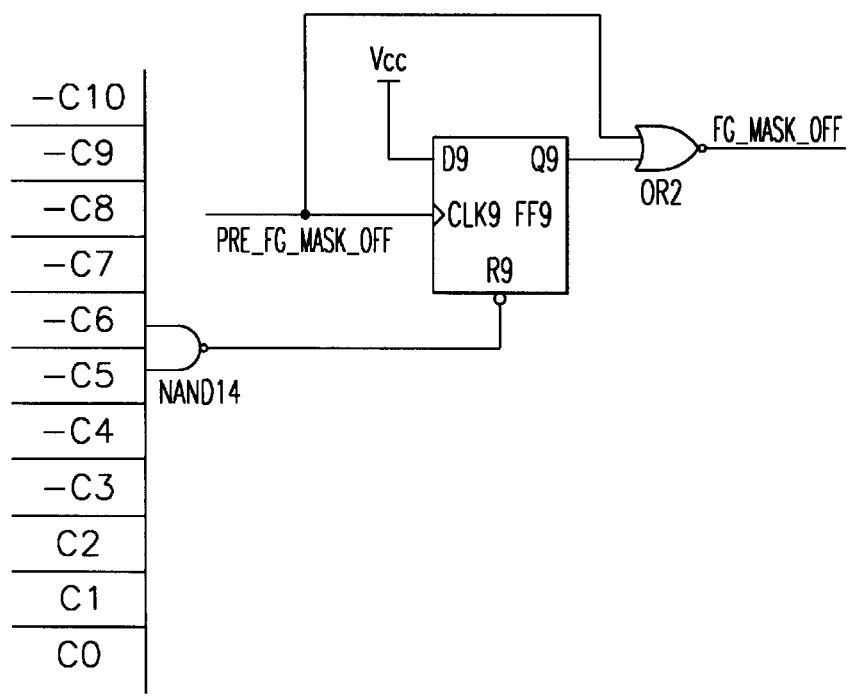
FIG. 18 is a schematic diagram of a switching noise removing signal generator of the output controller according to a preferred embodiment of the present invention.

FIG. 17 is a schematic diagram of the pre-switching noise removing signal generator, FIG. 18 is a schematic diagram of the switching noise removing signal generator, and FIG. 12 is a timing chart of the pre-switching noise removing signal and the switching noise removing signal.

The switching noise removing signal, for removing switching noises that occurs after commutation operations, prevents generation of switching noises during a one fourth period of the commutation controlling pulse.

Detailed operation of this feature will now be described.

Since the input terminal of the latch comprising the logic NAND gates NAND11 and NAND12 is coupled to the inverter INV5, an input value of the logic NAND gate 11 becomes like the signals shown in FIG. 12(*a*), and with the input value of the SWITCHING being as shown in FIG. 12(*b*), the output value, therefore, of the logic NAND gate NAND12 becomes like the signals shown in FIG. 12(*c*). That is, the logic NAND gate NAND12 continuously outputs high signals until a next commutation controlling pulse HALF_FG_PULSE is provided after a switching operation.

On the other hand, since an output value of the second comparator 700 is input to the flip-flop FF8 through the input terminal D8, and clock signals are provided to the flip-flop FF8 through the clock signal input terminal CLK8, and the output terminal Q8 of the flip-flop FF8 is coupled to the inverter INV6, the inverter INV6 outputs an inverted output value of the second comparator 700. That is, since the output value of the second comparator 700 becomes like the signals shown in FIG. 12(*d*) (in which a low signal is generated following the input of the switching signal plus one fourth of the period of the commutation controlling pulse HALF_FG_PULSE ) the output value of the inverter INV6 becomes like the signals shown in FIG. 12(*e*).

Hence, since a logical NAND operation is performed on the input values of FIGS. 12(*c*) and (*e*), the output value of the logic NAND gate NAND13 becomes like the signals shown in FIG. 12(*f*).

Operation of the switching noise removing signal generator 550 will now be described.

The reset signal input terminal R9 of the flip-flop FF9 is coupled to the logic NAND gate NAND14 that performs a NAND operation on the three least significant of output binary values of the first counter 200 and the inverted values of the remaining output binary values so that after a gate pulse of the commutation controlling pulses is output from commutation controlling pulse generator 20, the output value of the flip-flop FF9 is reset. In the present invention, it is assumed that the output value of the flip-flop FF9 is reset as low state.

Since logic values of FIG. 12(*f*) are input to the flip-flop FF9 through the clock signal input terminal CLK9, and the voltage Vcc is supplied to the input terminal D9, the output values of the flip-flop FF9 becomes like the signals shown in FIG. 12(*g*). Therefore, according to the operation of the switching noise removing signal generator 550, noise is removed that is generated when the switching operation occurs.

Operation of the excess counting preventer 560 will now be described, referring to FIG. 19, which is a schematic diagram of the excess counting generator.

When the period of the commutation controlling pulses are very long at an initiation of motor drive, and thereby, the period diverges from the range of time that can be counted by the counter, the reliability of commutation time cannot be guaranteed. Therefore, the excess counting preventer 560, for preventing a decrease in accuracy of the switching operation, generates switching signals and switching noise removing signals with respect to the longest time that can be measured by the counter. To accomplish this purpose, the clock signals to the counter are masked about the maximum value of the first counter 200 so as to maintain this maximum value.

Detailed operations of this feature will now be described. Since the clock signal input terminal CLK10 of the flip-flop FF10 is coupled to the output terminal of the logic NAND gate NAND15 which performs a logic NAND operation on the inverted output of two of the least significant values of the first counter plus its the remaining output bits, and the voltage Vcc is supplied to the input terminal D10, the output value of the flip-flop FF10 becomes like the signals of FIG. 12(*i*). Therefore, the output value of the inverter INV7 becomes like the signals of FIG. 12(*i*). Since the logic AND gate AND3 performs a logic AND operation on the output value of the inverter INV7 and the clocks CLK, when the low value the signal of FIG. 12(*j*) is provided the clock signals CLK are not input to the counter, and therefore, the operation of the first counter 200 is stopped, and the value counted up to that time is maintained.

By above operation, pulses as shown in FIG. 9 are generated. The present invention thereby accurately determines commutation time of each phase of the motor and enhances efficiency of motor drive.

While this invention has been described in connection with what is presently considered to be the most practical and preferred embodiment, it is to be understood that the invention is not limited to the disclosed embodiments. On the contrary, it is intended to cover various modifications and equivalent arrangements included within the spirit and scope of the appended claims.

What is claimed is:

1. In a sensorless three phase brushless direct current (BLDC) motor which determines a commutation time by detecting a back electromotive force (BEMF) generated in a coil of each phase of the motor, an apparatus for determining a commutation time of a three phase BLDC motor, comprising:

a commutation controlling pulse generation unit receiving a phase voltage of each phase and generating a commutation controlling pulse to determine a commutation time of each phase of the motor;

a first counter receiving a first commutation controlling pulse output from the commutation controlling pulse generator and counting a period of commutation controlling pulses;

a memory storing one half of the counted values of the period of the first commutation controlling pulses-counted by the first counter;

a first comparator comparing a counted value of a period of commutation controlling pulse provided after the first commutation controlling pulse counted by the first counter with one half of the counted values of the period of first commutation controlling pulses stored in the memory; and an output controller receiving the comparison result of the first comparator and outputting a switching signal to control commutation of each phase of the motor.

2. The apparatus of claim 1, wherein the apparatus further comprises:

a second counter receiving the switching signal and counting the period of switching signals; and a second comparator receiving and comparing one half of the counted value stored in the memory and the counted numbers of the second counter and outputting the comparison result to the output controller.

3. The apparatus of claim 2, wherein the output controller receives the output signals of the second comparator and outputs a switching noise removing signal to remove switching noises.

4. The apparatus of claim 3, wherein the commutation controlling pulse generation unit comprises:

a reference pulse generator receiving phase voltages of each phase of the motor and voltage of a neutral point, and outputting a reference pulse having a uniform period; and a commutation controlling pulse generator receiving the reference pulse of the reference pulse generator, switching signal, and switching noise removing signal of the output controller, and outputting a commutation controlling pulse generating as gate pulse type output each time a logic value of the reference pulse is changed.

5. The apparatus of claim 4, wherein the reference pulse generator comprises:

third, fourth, and fifth comparators having positive terminals to which phase voltages of the three phases are input, and having negative terminals to which voltage of the neutral point is supplied;

a first logic NAND gate performing a logic NAND operation on the outputs of the third and fourth comparators;

a second logic NAND gate performing a logic NAND operation on the outputs of the fourth and fifth comparators;

a third logic NAND gate performing a logic NAND operation on the outputs of the third and fifth comparators;

a first logic AND gate performing a logic AND operation on the outputs of the first, second, and third logic NAND gates and outputting a reference pulse, a period of the reference pulse being twice the period of commutation of the motor.

6. The apparatus of claim 4, wherein the commutation controlling pulse generator comprises:

a latch receiving the switching noise removing signal and the switching noise of the output controllers and outputting low logic values from the input time of the switching signal to the input time of the switching noise removing signal so that input of clock signals is prevented;

a second logic AND gate performing a logic AND operation on the output logic value of the latch and a clock signal and outputting a result;

a first flip-flop receiving the output of the second logic AND gate through a clock signal input terminal and the reference pulse of the reference pulse generator through an input terminal, and outputting the reference pulse to an output terminal according to the clock signals and the outputs of the second logic AND gate;

a second flip-flop receiving the output of the first flip-flop through an input terminal and the clock signals through another input terminal and outputting an output to the output terminal of the first flip-flop according to the clock signals;

a third flip-flop receiving the output of the second flip-flop and the clock signals, and outputting the output of the second flip-flop to an output terminal;

a first inverter coupled to the output terminal of the second flip-flop;

a fourth logic NAND gate receiving an output of the first inverter and an output of the third flip-flop and performing a logic NAND operation on the received signals;

a second inverter coupled to the output terminal of the third flip-flop;

a fifth logic NAND gate performing a logic NAND operation on the output values of the second flip-flop and the second inverter; and a sixth logic NAND gate performing a logic NAND operation on the output values of the fourth and fifth logic NAND gates, and wherein the apparatus generates a gate type pulse output each time the logic value of the reference pulse is changed.

7. The apparatus of claim 1, wherein the first counter counts a period of the first commutation controlling pulse by binary values using the clock pulses.

8. The apparatus of claim 1, wherein the memory stores the binary values counted by the first counter except for the least significant bit (LSB).

9. The apparatus of claim 1, wherein the first comparator compares the counted numbers of the commutation controlling pulses provided after the first commutation controlling pulse and one half of the counted number of the first commutation controlling pulse stored in the memory, and when the compared values are identical, outputs a first logic value.

10. The apparatus of claim 1, wherein the output controller comprises:
an enable signal generator receiving the commutation controlling pulse and, when the period of the commutation controlling pulse is constant, outputting an enable signal to output the switching signal;
an excess counting preventer receiving counted binary values of the first counter and, when the counting binary values exceeds the capacity of the counter, stopping the operation of the first counter;
a pre-switching noise removing signal generator receiving the commutation controlling pulse, switching signal, and the counted binary value of the second comparator, and generating a pre-switching noise removing signal for generating switching noise removing signals to remove switching noise;
a switching noise removing signal generator receiving the pre-switching noise removing signal from the pre-switching noise removing signal generator and counted binary value of the first counter, and removing switching noise generated by switching operations;
a pre-switching signal generator receiving an output of the first comparator and outputting an pre-switching signal for generating switching signals; and
a switching signal generator receiving the output binary values of the first counter and the pre-switching signal, and outputting a switching signal for performing commutation of each phase of the motor.

11. The apparatus of claim 10, wherein the enable signal generator comprises:
a fourth flip-flop receiving the commutation controlling pulse through a clock signal input terminal, and a logic NOT value of a previous signal from an output terminal through an input terminal, and outputting an input signal to the output terminal according to the commutation controlling pulse;
a third inverter coupled to the output terminal of the fourth flip-flop; and
a fifth flip-flop receiving an output signal of the third inverter through a clock signal input terminal and a high logic value through an input terminal, and outputting a high logic value to an output terminal according to the output signal of the third inverter.

12. The apparatus of claim 10, wherein the excess counting preventer comprises:
a seventh logic NAND gate performing logic NAND operation on inverted values of predetermined less significant bits of the counted binary values of the first counter and logic values of remaining bits;
a sixth flip-flop receiving an output value of the seventh logic NAND gate through a clock signal input terminal, and a logic high value through an input terminal, and outputting a logic high value according to an output value of an output logic value of the seventh logic NAND gate;
a fourth inverter coupled to an output terminal of the sixth flip-flop; and
a second logic AND gate performing a logic AND operation on the output value of the fourth inverter and the clock signal, and outputting the result to the clock signal input terminal of the first counter,
and wherein the clock signal is prevented from being input to the first counter when the counted binary values of the counter reaches a predetermined value.

13. The apparatus of claim 10, wherein the pre-switching noise removing signal generator comprises:
a seventh flip-flop receiving the clock signal through a clock signal input terminal, and an output value of the second comparator through an input terminal, and outputting an input value to an output terminal according to the clock signal;
a fifth inverter coupled to the seventh flip-flop; and
an eighth logic NAND gate receiving an output value of the fifth inverter and the enable signal and performing a logic NAND operation on received signals and outputting a signal.

14. The apparatus of claim 10, wherein the switching noise removing signal generator comprises:
a ninth logic NAND gate receiving the output counting binary value of the first counter and performing a logic NAND operation on inverted logic values of the pre-determined less significant bits of the first counter and logic values of remaining bits;
an eighth flipflop receiving the pre-switching noise removing signal of the pre-switching noise removing signal generator through a clock signal input terminal, and a logic high value through an input terminal, and outputting a logic high value to an output terminal according to the pre-switching noise removing signal; and
a first logic OR gate performing a logic OR operation on the output value of the eighth flip-flop and the pre-switching noise removing signal of the pre-switching noise removing signal generator, and outputting a result.

15. The apparatus of claim 10, wherein the pre-switching signal generator comprises:
a ninth flip-flop receiving the output value of the first comparator through an input terminal and the clock signals through a clock signal input terminal, and outputting output values of the first comparator to an output terminal according to the clock signals;
a seventh inverter coupled to an output terminal of the ninth flip-flop; and
a tenth logic NAND gate performing a logic NAND operation on the output value of the seventh inverter and the output enable signal of the enable signal generator and outputting the result.

16. The apparatus of claim 10, wherein the switching signal generator comprises:
an eleventh logic NAND gate receiving an output counted binary value of the first counter and performing a logic NAND operation on inverted logic values of predetermined less significant bits of the first counter and logic values of remaining bits;
a tenth flip-flop receiving the pre-switching signal of the pre-switching signal generator through a clock signal input terminal, and a logic high value through an input terminal, and an output logic value of the eleventh logic NAND gate through a reset signal input terminal, and outputting a signal to an output terminal according to the pre-switching signal; and
a second OR gate performing a logic OR operation on an output logic value of the output of the tenth flip-flop and the pre-switching signal of the pre-switching signal generator, and outputting a result.

17. In a sensorless three phase brushless direct current (BLDC) motor which determines a commutation time by detecting a back electromotive force (BEMF) generated in a coil of each phase of the motor, a method for determining a commutation time of a three phase BLDC motor, comprising the steps of:

receiving variations of the BEMF of each phase of the motor and generating commutation controlling pulses for determining a commutation time;

counting a duration of a period commutation controlling pulses;

storing one half of counted value of the counted period of commutation controlling pulses in a memory;

counting a period of the commutation controlling pulses provided after the counted period commutation controlling pulses;

comparing a counted number of the commutation controlling pulses input during the counting operation with the value stored in the memory; and generating a switching pulse to perform commutation of each phase of the motor when the comparison results are identical.

18. The method of claim 17, wherein the method further comprises the steps of:

counting the period of commutation controlling pulses after the switching pulse is generated;

generating a switching noise removing signal in order to prevent a change of a logic value of the commutation controlling pulse after the generation of the switching pulse;

comparing whether or not the counted number of the switching pulse is identical with one half of the value stored in the memory; and stopping the changes of the logic values of the commutation controlling pulse when the comparison results are identical so that the generation of a signal to remove noises at time of switching operation is stopped.

* * * * *